United States Patent
Arnall et al.

(10) Patent No.: US 11,730,169 B2
(45) Date of Patent: Aug. 22, 2023

(54) APPARATUS AND METHOD FOR PRODUCING SCORED DOUGH PIECES

(71) Applicant: General Mills, Inc., Minneapolis, MN (US)

(72) Inventors: Chad Arnall, Webb City, MO (US); Steven Cox, Long Lake, MN (US); Paul Henderson, Farmington, MN (US); Kara M Hobart, New Hope, MN (US); Olivia Murch, Minneapolis, MN (US); Todd A Rasmussen, North Branch, MN (US); Michael Snyder, Stacy, MN (US); Rodney W Worthy, Oronogo, MO (US)

(73) Assignee: General Mills, Inc., Minneapolis, MN (US)

( * ) Notice: Subject to any disclaimer, the term of this patent is extended or adjusted under 35 U.S.C. 154(b) by 608 days.

(21) Appl. No.: 16/779,886

(22) Filed: Feb. 3, 2020

(65) Prior Publication Data

US 2021/0235708 A1 Aug. 5, 2021

(51) Int. Cl.
*A21C 11/12* (2006.01)
*A21C 5/08* (2006.01)
(Continued)

(52) U.S. Cl.
CPC .............. *A21C 11/12* (2013.01); *A21C 5/08* (2013.01); *A21C 9/085* (2013.01); *A21C 11/10* (2013.01); *A21D 6/001* (2013.01); *A21D 6/008* (2013.01)

(58) Field of Classification Search
CPC .......... A21C 11/04; A21C 11/06; A21C 11/08; A21C 11/10; A21C 11/12; A21C 11/14; A21C 9/08; A21D 6/001; A21D 6/008
See application file for complete search history.

(56) References Cited

U.S. PATENT DOCUMENTS 2,887,964 A * 5/1959 Griner ..................... A21C 15/04
83/300
3,225,717 A * 12/1965 Page ......................... A21C 3/06
83/110

(Continued)

FOREIGN PATENT DOCUMENTS

| CA | 3103810 | 1/2020 |
|----|---------|--------|
| DE | 19549762 | 7/2007 |

(Continued)

OTHER PUBLICATIONS

J4 Tunnel Ovens, "Baguette Line, Tray System", Retrieved from the Internet: UR::https://www.youtube.com/watch?v=tmr12pEBfkg, Feb. 26, 2021.

*Primary Examiner* — Seyed Masoud Malekzadeh
(74) *Attorney, Agent, or Firm* — Diederiks & Whitelaw, PLC; John L. Crimmins, Esq.

(57) ABSTRACT

Frozen un-proofed dough pieces are produced by pinching an upper skin of an un-proofed dough body to a lower skin and producing a score through the upper skin prior to freezing. The un-proofed dough pieces are formed by mass production, with an un-proofed dough sheet being cut to form dough strips which are then cut into the un-proofed dough pieces, with the score for each un-proofed dough piece being formed either before, during or after the individual un-proofed dough pieces are actually created, but before freezing.

20 Claims, 9 Drawing Sheets

(51) Int. Cl.
 *A21C 9/08* (2006.01)
 *A21C 11/10* (2006.01)
 *A21D 6/00* (2006.01)

(56) References Cited

U.S. PATENT DOCUMENTS

| | | | |
|---|---|---|---|
| 3,765,909 A | 10/1973 | Moline | |
| 4,246,838 A * | 1/1981 | Pulver | A21C 11/12 |
| | | | 425/103 |
| 4,276,800 A * | 7/1981 | Koppa | A21C 11/04 |
| | | | 83/100 |
| 4,469,476 A | 9/1984 | Cavanagh et al. | |
| 4,650,687 A | 3/1987 | Willard et al. | |
| 5,349,759 A * | 9/1994 | Anton | A21C 11/10 |
| | | | 33/32.6 |
| 5,935,629 A | 8/1999 | Martin | |
| 6,783,782 B1 | 8/2004 | Larsen et al. | |
| 6,902,754 B1 * | 6/2005 | Evans | A21C 11/04 |
| | | | 426/503 |
| 8,535,039 B2 * | 9/2013 | Evans | A21C 11/10 |
| | | | 425/281 |
| 10,238,119 B2 * | 3/2019 | Evans | A21C 11/04 |
| 2003/0024360 A1 | 2/2003 | Ribble | |
| 2004/0197454 A1 * | 10/2004 | Henry | A21D 8/02 |
| | | | 426/549 |
| 2005/0031733 A1 | 2/2005 | Domingues et al. | |
| 2007/0178208 A1 | 8/2007 | Moidl et al. | |
| 2008/0289466 A1 * | 11/2008 | Takama | A21C 9/085 |
| | | | 426/518 |
| 2010/0159095 A1 * | 6/2010 | Suski | A21C 11/08 |
| | | | 425/279 |
| 2010/0173052 A1 * | 7/2010 | Suski | A21C 5/003 |
| | | | 425/294 |
| 2018/0289021 A1 | 10/2018 | Zorn | |
| 2019/0307135 A1 | 10/2019 | Gottenbusch et al. | |

FOREIGN PATENT DOCUMENTS

| | | |
|---|---|---|
| FR | 1114890 | 4/1956 |
| FR | 2666490 | 3/1992 |
| WO | WO 2004/037003 | 5/2004 |
| WO | WO 2004039163 | 5/2004 |
| WO | WO 2015/160238 | 10/2015 |

* cited by examiner

APPARATUS AND METHOD FOR PRODUCING SCORED DOUGH PIECES

BACKGROUND OF THE INVENTION

The present invention pertains to the art of food production and, more particularly, to the automated production of bread products. Bakery operators sometimes purchase frozen un-proofed bread dough, which they thaw, proof and bake prior to sale. Depending on the desired bread product, the bread dough may be manually scored after proofing and before baking to help control expansion during baking and to give the resulting bread product its traditional look. It would be beneficial to bakery operators if the frozen un-proofed dough already included a score. However, the changes that dough undergoes during proofing makes it difficult to utilize pre-proof scoring in a consistent manner, particularly for a commercial dough producing operation.

SUMMARY OF THE INVENTION

The present invention successfully achieves the goal of scoring bread dough before purchase by bakery operators by combining the scoring with blunt-edge cutting. The blunt-edge cutting is performed either after or simultaneously with the scoring to help pull the score open. After cutting and scoring, the dough is partially proofed and then frozen. More particularly, un-proofed dough pieces with scores are produced by directing a dough sheet along a conveyor with a lower skin of the dough sheet contacting the conveyor and an upper skin being spaced from the lower skin. At least one rotating, circular cutter cuts the dough sheet by pressing the upper skin toward the lower skin to pinch the upper and lower skins together while cutting. This technique stretches the upper skin of the dough as it is drawn toward the lower skin and pinches the two surfaces together as the dough is cut to form dough strips or pieces. Either below or simultaneous with the cutting, the upper skin is scored. The un-proofed and scored dough strips or pieces are then frozen.

In one embodiment, the scoring and blunt-edge cutting is performed by a plurality of blades fixed to a common driveshaft. In another embodiment, the scoring is performed by a first plurality of blades fixed to a first driveshaft, and the blunt-edge cutting is performed by a second plurality of blades fixed to a second driveshaft, with the first driveshaft located upstream from the second driveshaft.

Additional objects, features and advantages of the invention will become more readily apparent from the following detailed description of preferred embodiments thereof when taken in conjunction with the drawings wherein like reference numerals refer to common parts in the several views.

DETAILED DESCRIPTION OF THE INVENTION

Detailed embodiments of the present invention are disclosed herein. However, it is to be understood that the disclosed embodiments are merely exemplary of the invention that may be embodied in various and alternative forms. The figures are not necessarily to scale, and some features may be exaggerated or minimized to show details of particular components. Therefore, specific structural and functional details disclosed herein are not to be interpreted as limiting, but merely as a representative basis for teaching one skilled in the art to employ the present invention. Additionally, as used in connection with the present invention, terms such as "parallel" and "perpendicular" do not necessarily require, for example, that the relevant items be perfectly parallel. Instead, these terms include a margin of error of +/−5° (regardless of whether the error is by design or due to inherent manufacturing limitations) so long as the error does not prevent the present invention from functioning as intended.

As discussed above, it would be desirable to provide bread dough that is scored before delivery to bakery operators in a frozen un-proofed state. However, attempts to score un-proofed bread dough prior to freezing have shown that it is difficult to make a score in the dough prior to freezing in a manner that consistently produces the desired end result upon baking. The present invention successfully achieves this goal by combining the scoring of bread dough with a dough cutting technique that stretches the upper skin of dough to help pull the score open in such a way that the score remains intact during freezing, as well as when the baker operator(s) thaws, proofs and bakes the dough.

Various dough cutting approaches are described in U.S. Pat. No. 6,902,754, for example, which is incorporated herein by reference. This patent discloses a cutter including a blunt-edge dough-cutting or dough-engaging surface that is configured to draw a first or upper surface or skin of a dough toward a second or lower surface or skin of the dough when the cutter is impinged on the dough. The various dough cutting techniques described in U.S. Pat. No. 6,902,754 can be more generally referred to herein as "blunt-edge" cutting.

In one embodiment, this technique stretches the upper skin of the dough as it is drawn toward the lower skin and pinches the two surfaces together as the dough is cut to form dough strips or pieces. This results in a dough product that has rounded dimensions and more closely resembles a hand-formed dough product than dough cut by traditional techniques.

It has been discovered that placing a score in the upper skin of the un-proofed dough prior to freezing results in a scored dough product with functional and aesthetic attributes comparable to dough products that are scored after proofing. Although there are multiple ways to combine scoring and blunt-edge cutting, the discussion below particularly highlights advantages when scoring takes place before or at substantially the same time as cutting.

Figure 1:
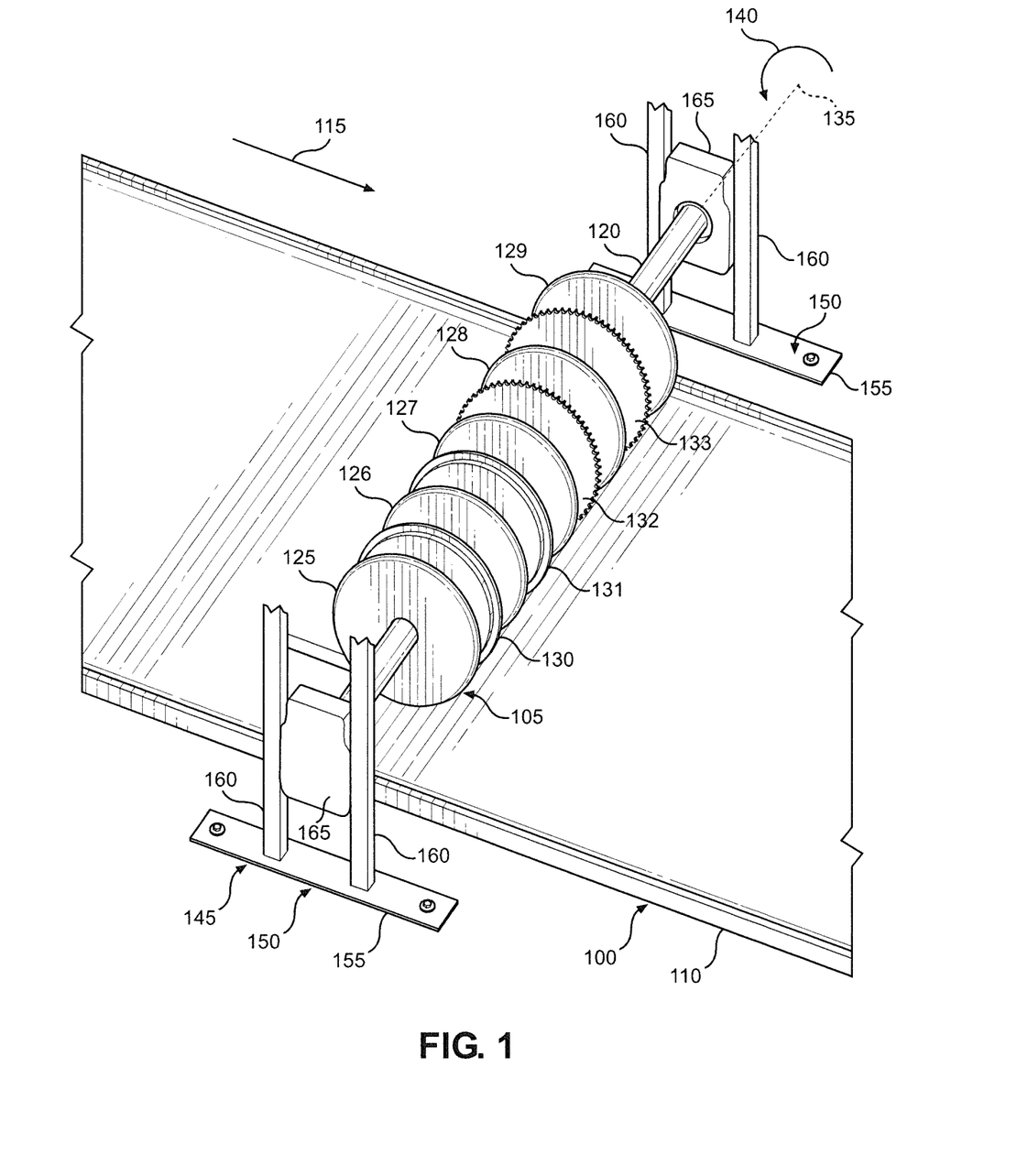
FIG. 1 is a perspective view of a portion of a production line for producing dough pieces in accordance with the present invention.

With reference to FIG. 1, an embodiment of the present invention is shown where scoring and blunt-edge cutting take place simultaneously. Specifically, FIG. 1 shows a portion of a production line including a conveyor system 100 and a rotary dough cutter 105. Conveyor system 100 includes a conveyor belt 110 for supporting and transporting a dough sheet (not shown in FIG. 1). However, other conveyor arrangements known in the art can be used with the present invention. As shown, conveyor belt 110 passes beneath rotary cutter 105 while traveling in a direction 115.

Rotary cutter 105 includes a driveshaft 120 and a plurality of circular blades 125-133. Driveshaft 120 is aligned perpendicular to direction 115. Accordingly, the axis of rotation 135 for rotary cutter 105 is also aligned perpendicular to direction 115. Rotary cutter 105 is configured such that contact between rotary cutter 105 and conveyor belt 110, or a dough sheet supported by conveyor belt 110, causes rotary cutter 105 to rotate in a direction 140 as conveyor belt 110 travels in direction 115. Alternatively, a motor and transmission (not shown) can be provided for driving rotary cutter 105, i.e., for causing rotary cutter 105 to rotate in direction 140.

Blades 125-133 are fixedly coupled to driveshaft 120 such that rotation of driveshaft 120 results in rotation of blades 125-133. Each of blades 125-133 is either configured to cut or score a dough sheet being transported by conveyor belt 110. Specifically, blades 125-129 are blunt-edge blades or circular cutters and are configured to cut the dough sheet into dough strips, while blades 130-133 are configured to score the dough sheet. For purposes of the present invention, "cutting" (and its variants) means that the dough is cut all the way through. "Scoring" (and its variants) means that the dough is cut only part of the way through. For illustration purposes, blades 130 and 131 are shown as straight-edge blades, and blades 132 and 133 are shown as serrated blades. However, in practice, one or the other would be chosen and used for all the scoring blades. Preferably, straight-edge blades are used. Also, while nine blades are shown, other numbers of blades can be used depending on the width of the dough sheet and the desired width of the resulting dough strips.

Rotary cutter 105 is supported above conveyor belt 110 by a support structure 145. The details of support structure 145 are not important to the present invention. However, it can be seen that support structure 145 includes identical left and right supports 150. Each support 150 has a base 155 and a pair of columns 160, supporting a bearing 165, which can incorporate a drive motor. Bearings 165 receive the ends of driveshaft 120 to facilitate rotation of rotary cutter 105.

Figure 2A:
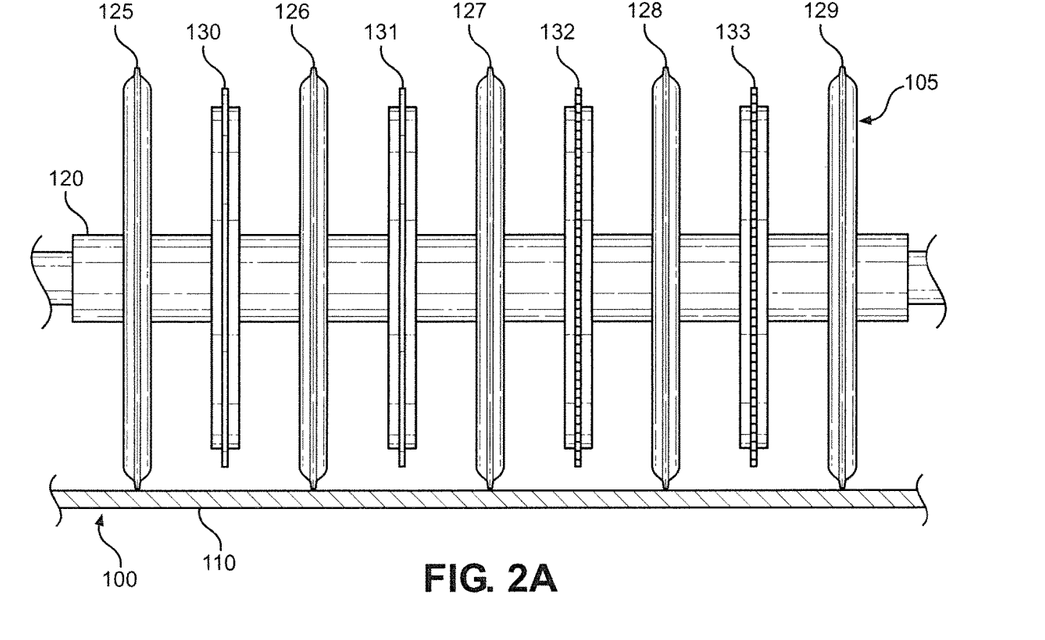
FIG. 2A is a front view of a conveyor belt and rotary cutter of the production line without a dough sheet in place.
Figure 2B:
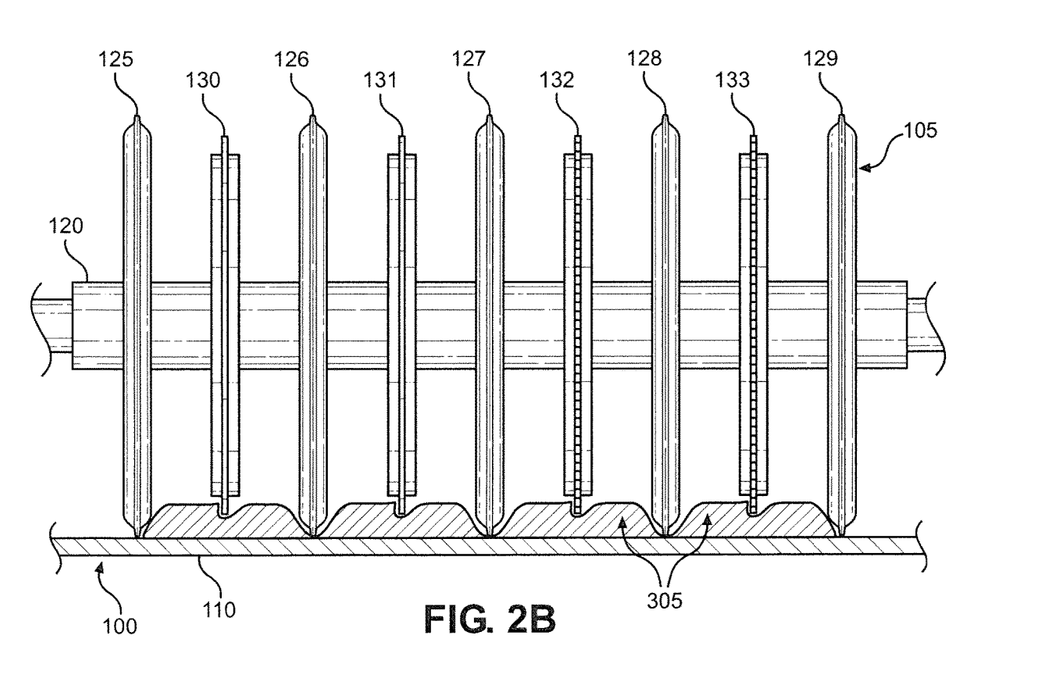
FIG. 2B is a front view of the conveyor belt and rotary cutter of the production line with a dough sheet being cut.

Turning to FIGS. 2A and 2B, a front view of conveyor belt 110 and rotary cutter 105 is provided. That is, the views of FIGS. 2A and 2B are taken in the direction opposite direction 115. This view highlights the positioning of blades 125-133 relative to conveyor belt 110. Specifically, blades 125-129 are positioned in contact with, or just out of contact with, conveyor belt 110 so as to cut a dough sheet traveling along conveyor belt 110 (not shown in FIG. 2A). Blades 130-133 are positioned further from conveyor belt 110 so as to score the dough sheet. To accomplish this, blades 125-129 have larger diameters than blades 130-133. However, in other embodiments, blades 125-129 and 130-133 can all have the same diameter and be fixed to different driveshafts, with the driveshafts located at different vertical positions relative to conveyor belt 110. Each of blades 125-129 has a blunt-edge dough engaging portion (not separately labeled) designed to stretch the upper skin of the dough sheet and cut the dough as detailed further below.

Figure 3:
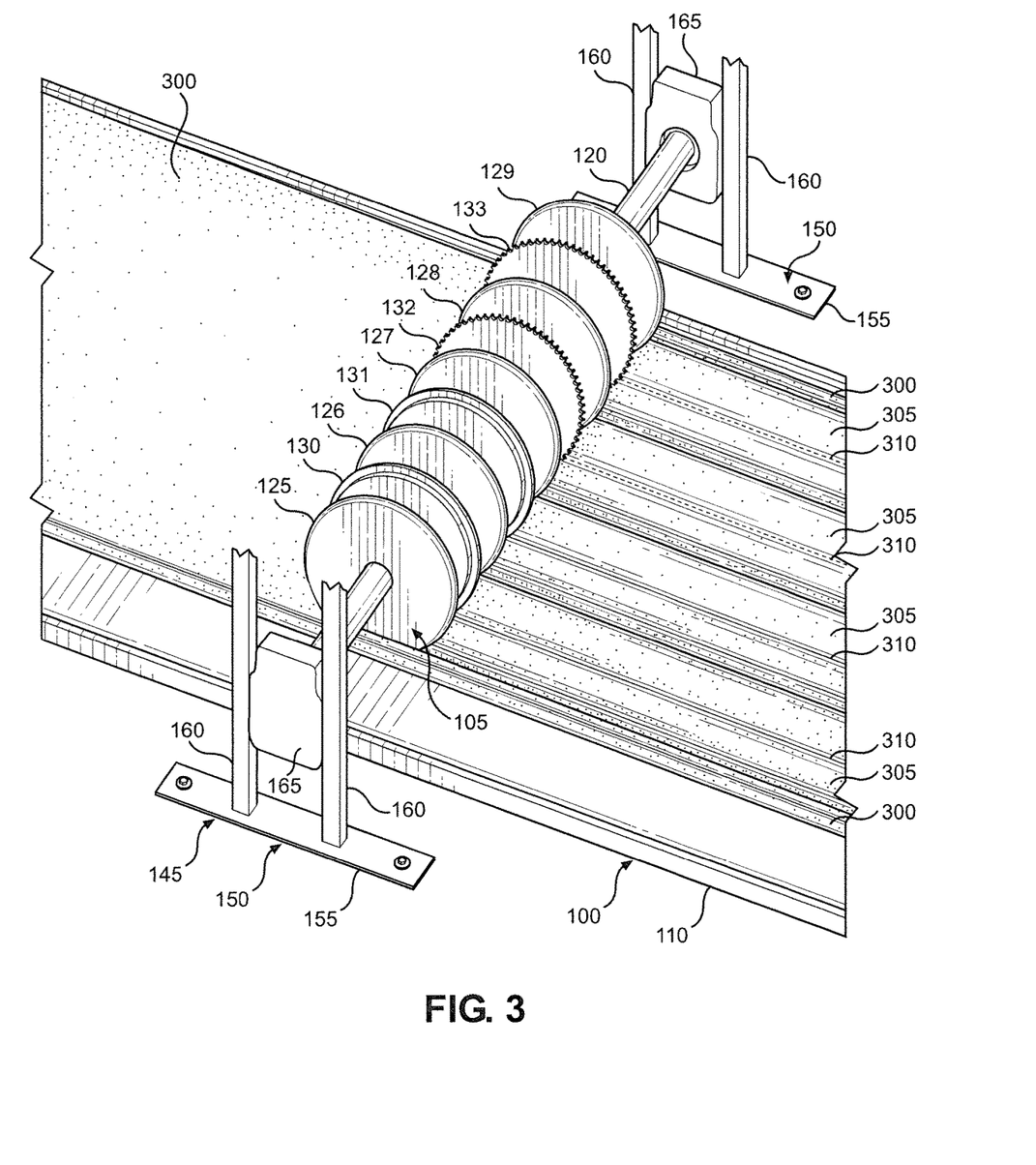
FIG. 3 is a perspective view of the portion of the production line, showing a dough sheet being cut by the rotary cutter.

With reference now to FIG. 3, a dough sheet 300 has an exposed upper dough skin and a lower dough skin (not separately labeled in this figure but discussed further below) supported on and transported by conveyor belt 110. Although not shown, it should be understood that the dough of dough sheet 300 is preferably formed in a batch maker or the like and then processed into dough sheet 300. Dough sheet 300 passes beneath rotary cutter 105, which is configured to continuously cut and score dough sheet 300 as dough sheet 300 is transported in direction 115. For example, FIGS. 2B and 3 show a plurality of dough strips 305, which were formed from dough sheet 300 by blades 125-129, and a plurality of scores 310, which were formed in dough strips 305 by blades 130-133, with each score 310 extending parallel to a longitudinal axis of an associated dough strip 305. Later, dough strips 305 are cut crosswise (i.e., in a direction parallel to driveshaft 120) to form a plurality of dough pieces.

In particular, the dough engaging portion (not separately labeled but clearly shown in FIG. 2B) of each blade 125-129 draws or presses the upper dough skin toward the lower dough skin to pinch the two skins together while cutting. At the same time, first and second longitudinally extending dough strip sides (not separately labeled here but discussed further below) are formed from the upper dough skin for each dough strip or piece. By cutting the dough in this manner, the upper dough skin is stretched at or about the same time that blades 130-133 score the dough, thereby producing dough pieces having more pronounced scores.

Figure 4:
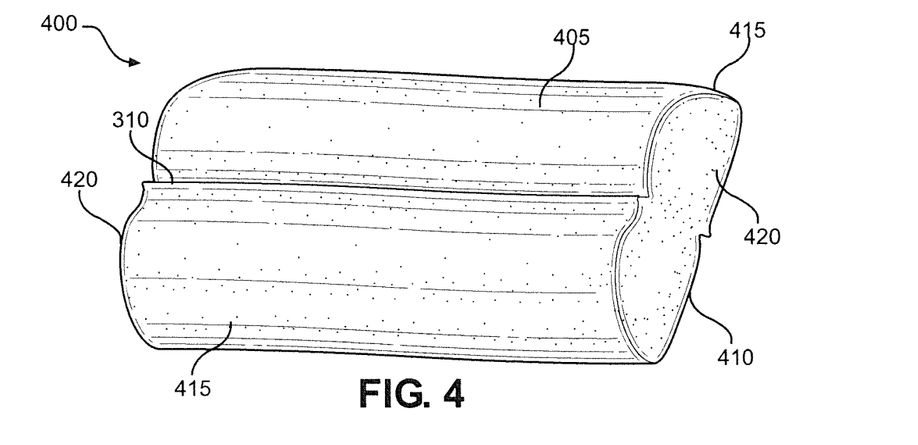
FIG. 4 is a perspective view of a dough piece formed using the production line.

One such dough piece is shown in FIG. 4. In particular, a dough piece 400 has an upper surface or skin 405, a lower surface or skin 410 opposite upper surface 405, opposing side surfaces 415, formed from the upper skin 405 and advantageously rounded due to the particular cutting arrangement, and opposing end surfaces 420. Score 310 was formed in upper surface 405 by one of blades 130-133, and side surfaces 415 were formed by two of blades 125-129. End surfaces 420 were formed by another dough cutter (not shown) when one of strips 305 was cut crosswise. This other cutter can take the form of a guillotine dough cutter, for example. After formation of dough piece 400, dough piece 400 is then frozen in an un-proofed state. At this point, it should be noted that "un-proofed" in accordance with eh invention means that no substantial or intentional actions are taken to promote proofing. Rather, the dough pieces are, at the very least, frozen shortly after being formed so as to save proofing for later. Once frozen, un-proofed dough piece 400 can be transported to a bakery operator, for example, who thaws, proofs, bakes and sells the resulting bread product.

Figure 5:
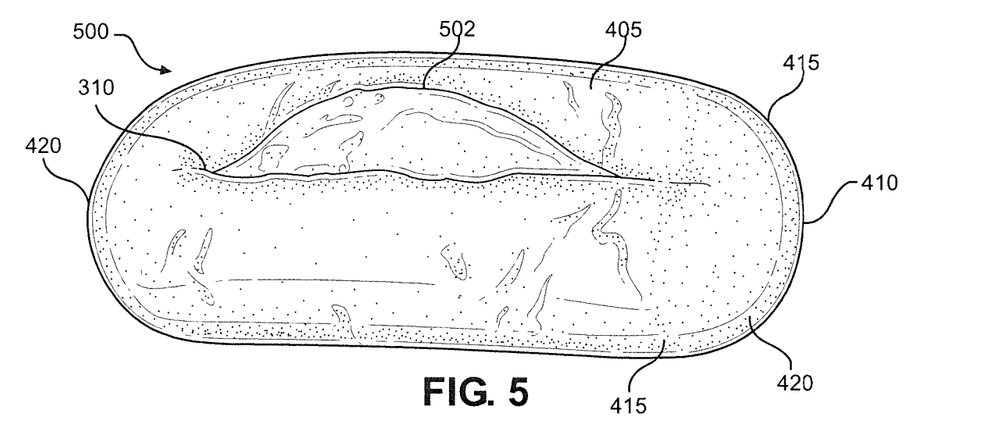
FIG. 5 is a perspective view of the dough piece after baking.

FIG. 5 shows such a bread product. Specifically, FIG. 5 shows a bread product 500, which corresponds to dough piece 400 after baking. As such, bread product 500 also has upper surface 405, lower surface 410, side surfaces 415 and end surfaces 420. In addition, score 310 can be seen near end surfaces 420. However, in the central portion of bread product 500, score 310 has opened up, forming an opening 502. This occurs during baking of dough piece 400 as dough piece 400 expands. In the embodiment illustrated, dough product 500 is in the form of a baguette. However, it should be recognized that other bread products can certainly be produced in accordance with the present invention.

Figure 6:
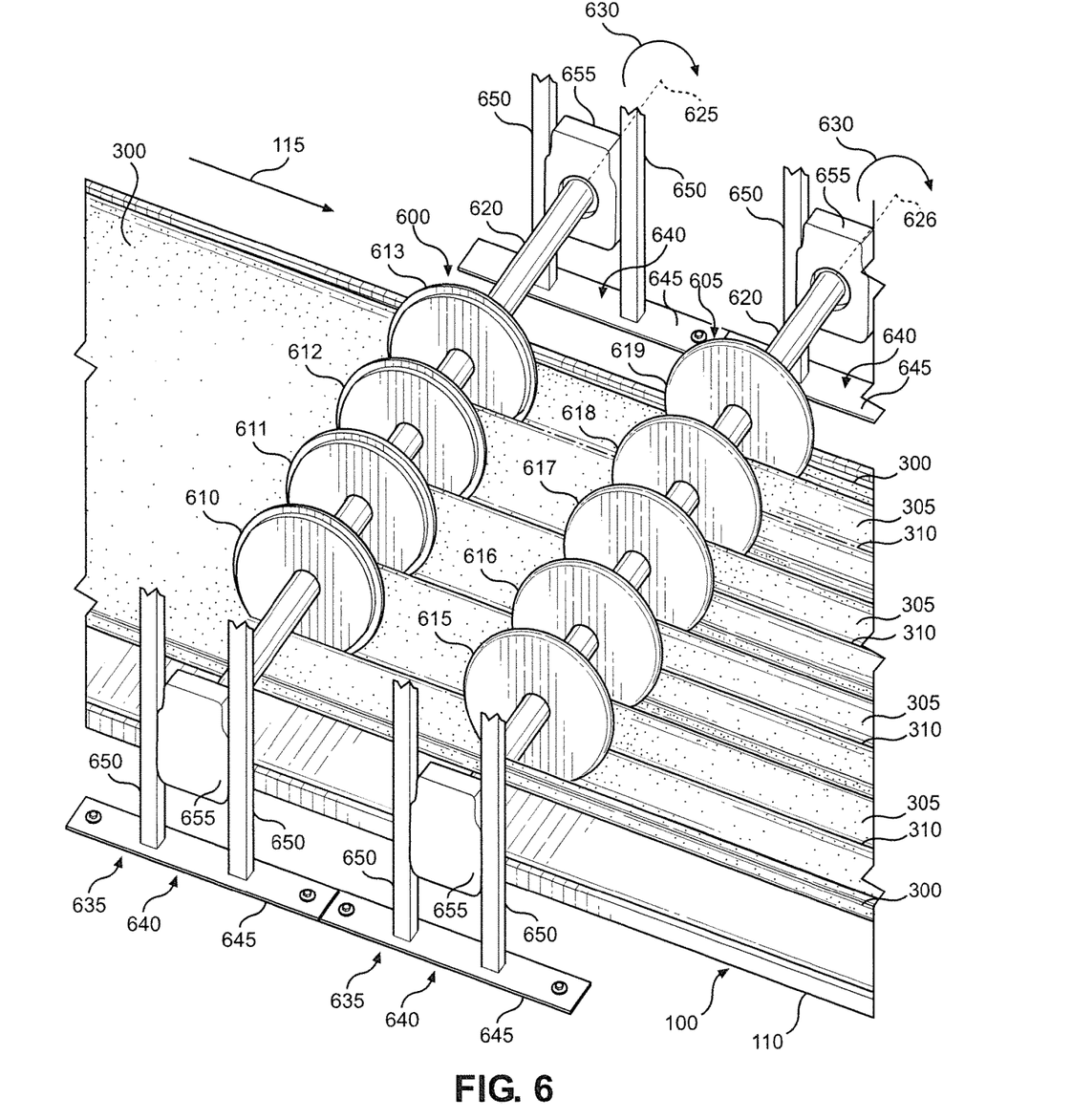
FIG. 6 is a perspective view of a portion of a second production line for producing dough pieces in accordance with the present invention.

With reference now to FIG. 6, an embodiment of the present invention is shown where scoring takes place before blunt-edge cutting. Specifically, FIG. 6 shows a portion of a production line including conveyor system 100, a rotary dough scorer 600 and a rotary dough cutter 605. Conveyor system 100 is constructed and functions in the same manner as in the embodiment of FIG. 1. That is, conveyor belt 110 of conveyor system 100 transports dough sheet 300 in direction 115 such that dough sheet 300 passes beneath rotary scorer 600 and rotary cutter 605.

Rotary scorer 600 and rotary cutter 605 are constructed similarly to rotary cutter 105 and together accomplish the same objective. Essentially, rotary cutter 105 has been split into two units, with rotary scorer 600 located upstream of rotary cutter 605 such that scoring can take place before blunt-edge cutting. Rotary scorer 600 includes a plurality of circular blades 610-613, which are configured to score dough sheet 300, and rotary cutter 605 includes a plurality of circular blades 615-619, which are blunt-edge blades or cutters and are configured to cut dough sheet 300 into dough strips 305. In the embodiment illustrated, blades 610-613 are straight-edge blades. However, serrated blades can be used instead if desired.

Each of rotary scorer 600 and rotary cutter 605 includes a driveshaft 620 to which blades 610-613 or 615-619 are fixedly coupled. Accordingly, rotation of driveshafts 620 results in rotation of blades 610-613 and 615-619. Driveshafts 620 are aligned perpendicular to direction 115. Therefore, the axes of rotation for rotary scorer 600 and rotary cutter 605 (labeled 625 and 626) are also aligned perpendicular to direction 115. Rotary scorer 600 and rotary cutter 605 are configured such that contact with conveyor belt 110 or dough sheet 300 causes rotary scorer 600 and rotary cutter 605 to rotate in a direction 630 as conveyor belt 110 travels in direction 115. Alternatively, rotary scorer 600 and rotary cutter 605 can be driven using one or more motors.

Each of rotary scorer 600 and rotary cutter 605 is supported above conveyor belt 110 by a support structure 635. The details of support structures 635 are not important to the present invention. However, it can be seen that each support structure 635 includes identical left and right supports 640. Each support 640 has a base 645 and a pair of columns 650, which support a bearing 655. Bearings 655 receive the ends of driveshafts 620 to facilitate rotation of rotary scorer 600 and rotary cutter 605.

Like rotary cutter 105, rotary scorer 600 and rotary cutter 605 are used in the production of scored dough pieces, such as dough piece 400, where the scores stay intact through freezing, thawing and proofing. Both embodiments achieve this goal by combining the scoring of bread dough with blunt-edge cutting. Specifically, as the blunt-edge cutting takes place either after or at the same time as the scoring, the blunt-edge cutting helps pull the score open in such a way that the score remains intact during later production steps and all the way to receipt of the bread dough by end users. That is, the score remains intact through partial proofing and freezing by the producer and thawing, proofing and baking by the end user.

Alternatively, it is possible to score bread dough after blunt-edge cutting (e.g., by swapping the positions of rotary scorer 600 and rotary cutter 605 or even by scoring individual dough pieces). In such instances, stretching of the upper skin caused by the blunt-edge cutting will still cause the score to open to a greater degree than if the blunt-edge cutting techniques are not used.

While the embodiments of FIGS. 1 and 6 utilize circular blades, other means of scoring dough can be used in connection with the present invention. For example, a linear blade like a guillotine, a lateral slicing blade, a water blade, an ultrasonic blade and laser blade arrangements could be employed. In any case, such scoring means, in combination with blunt-edge cutting, produce the desired results.

Figure 7:
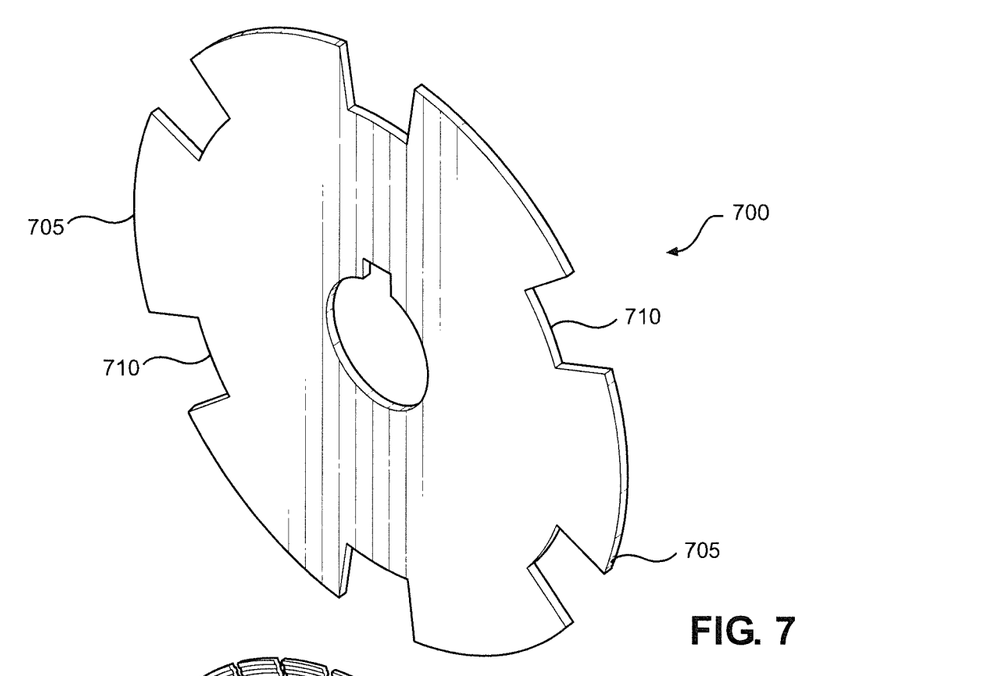
FIG. 7 is a perspective view of a first blade that can be used with the rotary cutter.
Figure 8:
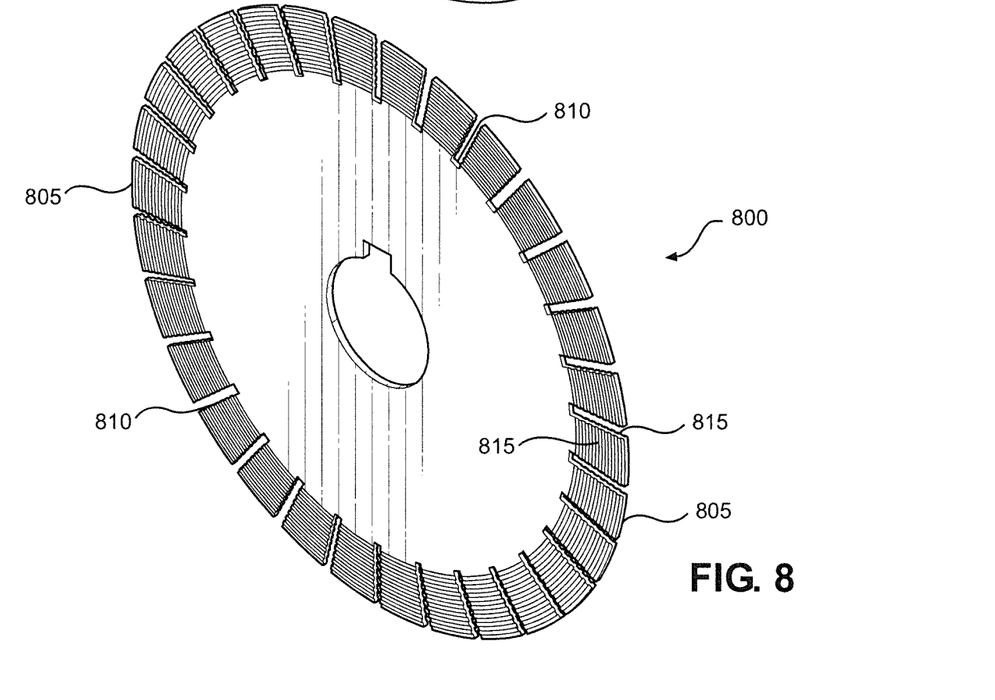
FIG. 8 is a perspective view of a second blade that can be used with the rotary cutter.
Figure 9:
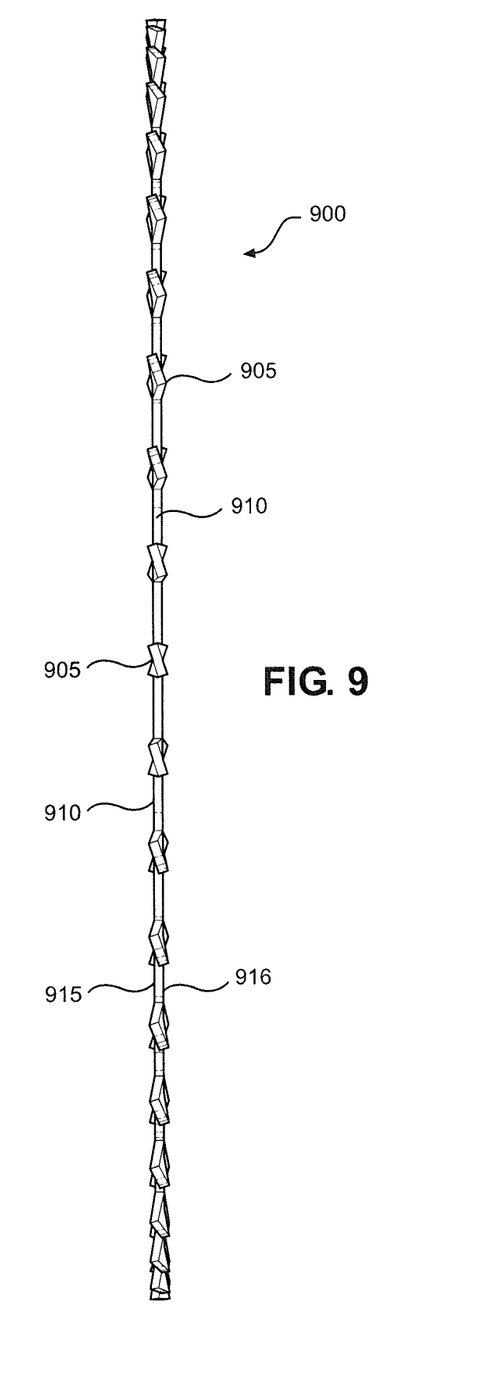
FIG. 9 is a top view of a third blade that can be used with the rotary cutter.

FIGS. 7-9 show additional blades that can be used with rotary cutter 105 or rotary scorer 600. Specifically, the blades shown are used to score dough rather than cut all the way through the dough. FIG. 7 is a perspective view of a blade 700 having multiple segments 705 spaced by indentations or cutouts 710. Segments 705 are configured to extend into dough passing beneath blade 700 to score the dough. Preferably, indentations 710 are positioned so that the scores formed by segments 705 do not extend all the way to the ends of the resulting dough pieces. Therefore, it should be recognized that the relative sizes of segments 705 and indentations 710, as well as their number, can vary depending on the desired length of the score relative to the overall length of the dough piece and the desired length of the dough piece.

FIG. 8 is a perspective view of a blade 800 having multiple segments or serrations 805 spaced by indentations or cutouts 810. Segments 805 are configured to extend into dough passing beneath blade 800 to score the dough. There are a number of factors that affect the quality of the scores produced by the present invention, including the friction of the dough-blade interaction, which is itself affected by how sharp or dull the blades that do the scoring are, the surface roughness of the blades, the corner beveling of the blades or the serrations of the blades, etc. Accordingly, in some embodiments, the opposing faces of the blades are roughened through the inclusion of a texture on these surfaces. In the case of blade 800, the opposing outer faces 815 of segments 805 are textured. Other factors that affect the quality of the scoring include the thickness of the blade used and the depth of the cut into the dough.

FIG. 9 is a top view of a blade 900 having multiple segments or serrations 905 spaced by indentations or cutouts 910. Segments 905 are configured to extend into dough passing beneath blade 900 to score the dough. Segments 905 are angled relative to opposing faces 915 and 916 of blade 900, which affect the score produced by blade 900. In the embodiment illustrated, the angle is the same for each of segments 905, and all of segments 905 are angled in the same direction.

Figure 10:
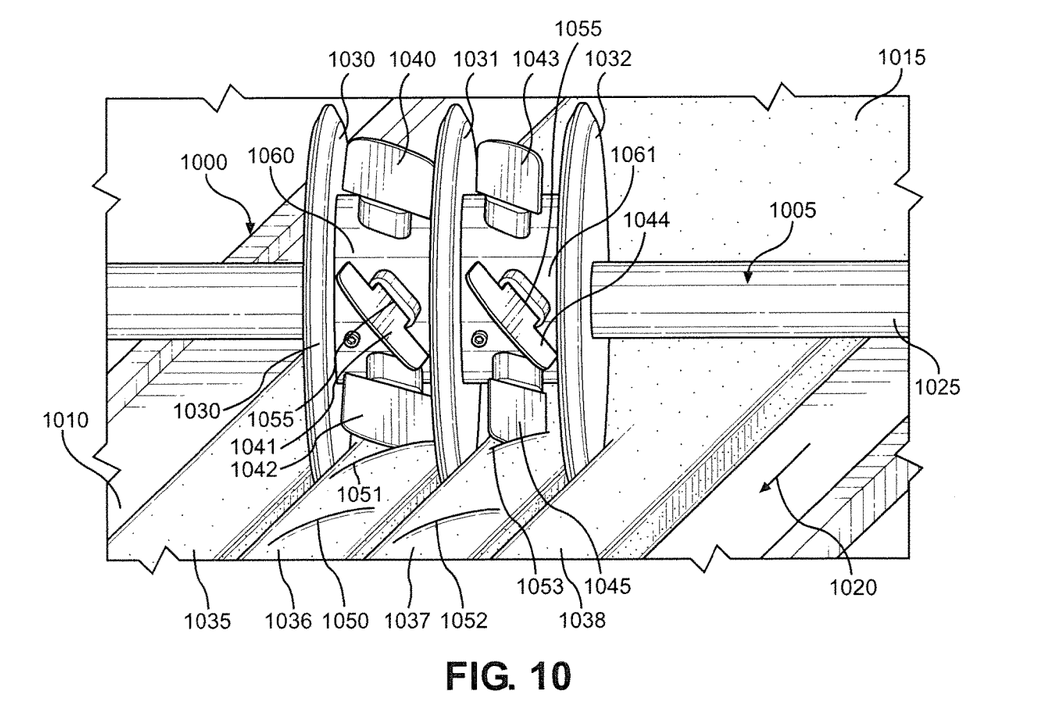
FIG. 10 is a perspective view of a portion of a third production line for producing dough pieces in accordance with the present invention.

With reference now to FIG. 10, another embodiment of the present invention is shown where scoring and blunt-edge cutting take place simultaneously to form angles or crosswise scores in the dough. Specifically, FIG. 10 shows a portion of a production line including a conveyor system 1000 and a rotary dough cutter 1005. Conveyor system 1000 includes a conveyor belt 1010 for supporting and transporting a dough sheet 1015. However, other conveyor systems known in the art can be used with the present invention. Conveyor belt 1010 passes beneath rotary cutter 1005 while traveling in a direction 1020.

Rotary cutter 1005 includes a driveshaft 1025 and a plurality of circular blades 1030-1032. Driveshaft 1025 is aligned perpendicular to direction 1020. Accordingly, the axis of rotation for rotary cutter 1005 is also aligned perpendicular to direction 1020. Rotary cutter 1005 is configured such that contact between rotary cutter 1005 and conveyor belt 1010 or dough sheet 1015 causes rotary cutter 1005 to rotate as conveyor belt 1010 travels in direction 1020. Alternatively, a motor and transmission (not shown) can be provided for driving rotary cutter 1005, i.e., for causing rotary cutter 1005 to rotate.

Blades 1030-1032 are fixedly coupled to driveshaft 1025 such that rotation of driveshaft 1025 results in rotation of blades 1030-1032. Each of blades 1030-133 is configured to cut dough sheet 1015 as dough sheet 1015 is being transported by conveyor belt 1010. Specifically, blades 1030-1032 are blunt-edge blades and are configured to cut dough sheet 1015 into dough strips 1035-1038. Later, dough strips 1036 and 1037 are cut crosswise (i.e., in a direction parallel to driveshaft 1025) to form a plurality of dough pieces.

This embodiment differs from the embodiments of FIGS. 1 and 6 in that non-circular blades are used for the scoring. In particular, rotary cutter 1005 includes blades 1040-1045, which are configured to score dough sheet 1015. For example, scores 1050-1053 can be seen in dough strips 1036 and 1037. Blades 1040-1045 are fixedly coupled to driveshaft 1025 using mounting holes 1055 formed in collars 1060 and 1061. Although not visible in FIG. 10, it should be recognized that non-circular blades extend all the way around collars 1060 and 1061 to continuously score dough strips 1036 and 1037 as dough sheet 1015 travels in direction 1020.

For illustration purposes, the blade arrangement of collar 1060 is different from the blade arrangement of collar 1061. In practice, however, the blade arrangements are preferably the same for each of collars 1060 and 1061. Regardless, blades 1040-1042 and 1044 all match one another, while blades 1043 and 1045 are shorter so as to form relatively shorter scores in dough sheet 1015. Using blades of different length can be beneficial if there is a desire to form a dough product with a longer slit in the middle and shorter slits at the ends, for example.

As with the embodiment of FIGS. 1 and 6, the embodiment of FIG. 10 can be modified such that scoring takes place before or after blunt-edge cutting (rather than simultaneously). For example, blades 1040-1045 can be mounted to another driveshaft upstream or downstream from driveshaft 1025, i.e., upstream or downstream from blades 1030-1032.

Figure 11:
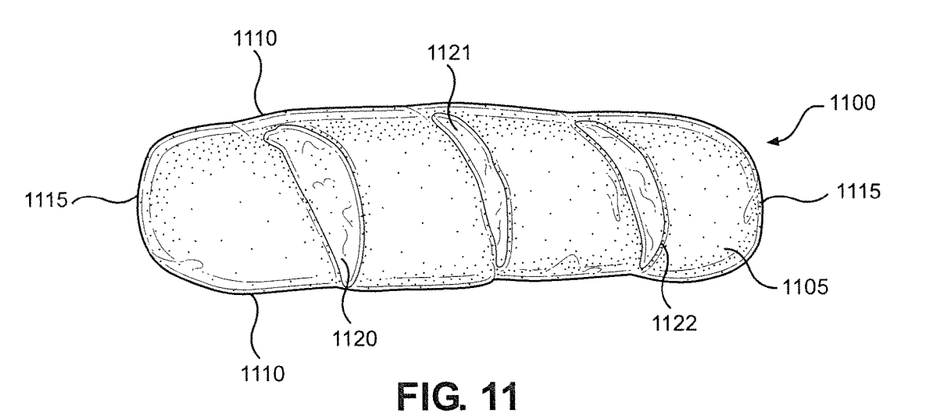
FIG. 11 is a perspective view of a dough piece formed using the third production line.

FIG. 11 shows a bread product 1100 produced by baking one of the dough pieces formed using the embodiment of FIG. 10. Bread product 1100 has an upper surface or skin 1105, a lower surface or skin opposite upper surface 1105 (not visible), opposing side surfaces 1110 connecting upper surface 1105 and the lower surface and opposing end surfaces 1115. Scores 1120-1122 were formed in upper surface 1105 by three of blades 1040-1045, and side surfaces 1110 were formed by two of blades 1030-1032. End surfaces 1115 were formed by another dough cutter (not shown) when one of strips 1036 and 1037 was cut crosswise.

As compared with scores 1050-1053, which are visible in FIG. 10, scores 1120-1122 have opened up. This would have occurred during baking of the dough piece that became bread product 1100 as the dough piece expanded. As desired for such bread products, the bread in scores 1120-1122 is substantially lighter in color than the rest of the exterior of bread product 1100. In particular, the bread in scores 1120-1122 is preferably much closer in color to the interior of bread product 1100 than to the rest of the exterior of bread product 1100.

Figure 12:
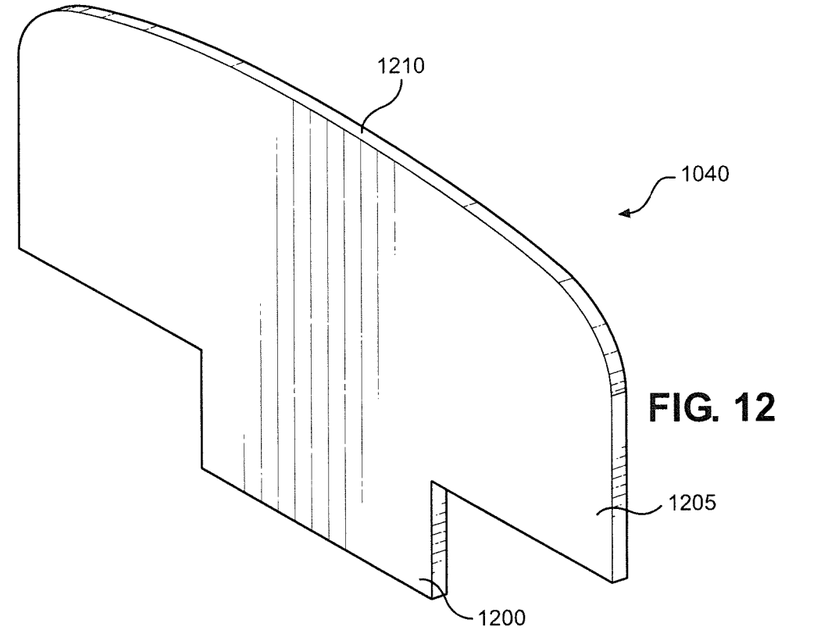
FIG. 12 is a perspective view of a first blade that can be used with a rotary cutter of the third production line.

Turning to FIG. 12, blade 1040 is shown by itself. Blade 1040 has a base 1200, which is configured to be received in one of mounting holes 1055 of collar 1060 or 1061 to secure blade 1040 to driveshaft 1025. Blade 1040 also has a head 1205 with a cutting or scoring edge 1210, which is configured to score dough, as described above.

Like the circular scoring blades discussed in connection with FIGS. 1-3 and 6-9, non-circular scoring blades, such as blade 1040, can vary in design in terms of their shape and thickness, the length of their cutting edges, their surface roughness, etc. This is evidenced by FIG. 10, which shows two types of blades: blades 1040-1042 and 1044 and blades 1043 and 1045. The difference between these two designs is essentially just the different lengths of the cutting or scoring edges.

Figure 13:
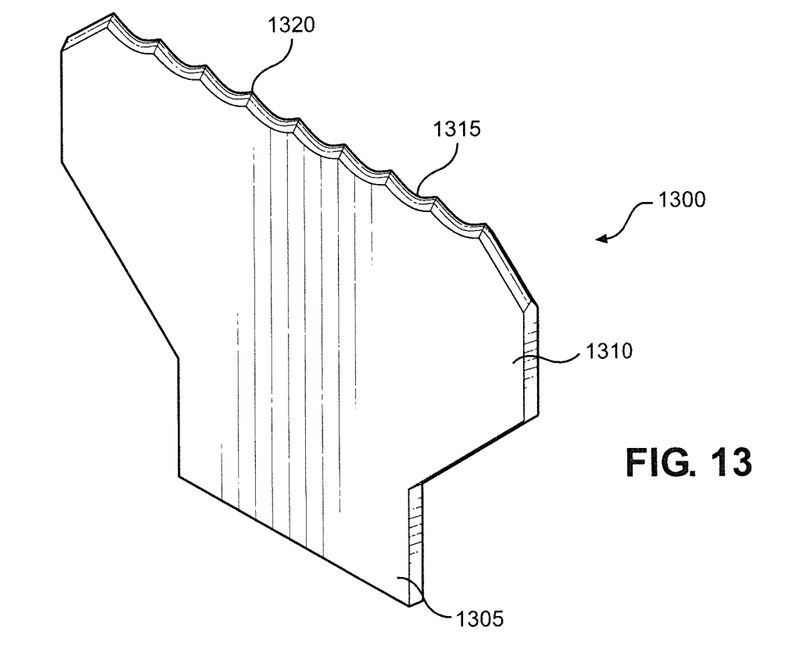
FIG. 13 is a perspective view of a second blade that can be used with the rotary cutter of the third production line.

FIG. 13 shows another non-circular blade design that can be used with the embodiment of FIG. 10. Specifically, a blade 1300 has a base 1305, which is configured to be received in one of mounting holes 1055 of collar 1060 or 1061 to secure blade 1300 to driveshaft 1025. Blade 1300 also has a head 1310 with a cutting or scoring edge 1315, which is configured to score dough. Unlike blades 1040-1045, cutting edge 1315 has a plurality of serrations 1320, such that blade 1300 is serrated. Otherwise, blade 1300 functions in the same manner as blades 1040-1045.

Based on the above, it should be recognized that, in accordance with the present invention, mass production with scoring an un-proofed dough prior to freezing advantageously results in later thawed, proofed and baked dough pieces with functional and aesthetic attributes comparable to dough products which are scored after proofing such that the present invention provides scored dough pieces where the score remains intact through freezing, thawing and proofing, as well as apparatuses and methods for producing the scored dough pieces. While certain preferred embodiments of the present invention have been set forth, it should be understood that various changes or modifications could be made without departing from the spirit of the present invention. In general, the invention is only intended to be limited by the scope of the following claims.

The invention claimed is:

1. A method for producing frozen un-proofed dough pieces with scores, the method comprising:
    transporting an un-proofed dough sheet with a conveyor, the dough sheet having a lower skin in contact with the conveyor, an upper skin opposite the lower skin;
    cutting the dough sheet with at least one circular cutter configured to cut the dough sheet into a plurality of dough strips as the at least one circular cutter rotates, the at least one circular cutter having a dough engaging portion configured to press the upper skin toward the lower skin to pinch the upper and lower skins together while cutting to form first and second dough strip sides;
    cutting the plurality of dough strips to form a plurality of un-proofed dough pieces;
    for each of the plurality of un-proofed dough pieces, penetrating the upper skin with at least one blade to cut through in part the un-proofed dough sheet from the upper skin toward the lower skin to form a score, wherein the at least one blade is configured to form the score that forms an opening during baking of a respective one of said plurality of un-proofed dough pieces; and
    freezing the un-proofed dough pieces.

2. The method of claim 1, wherein the scores are formed before cutting the plurality of dough strips to form the plurality of un-proofed dough pieces.

3. The method of claim 2, wherein the at least one circular cutter is fixed to a first driveshaft, the at least one blade is a circular blade fixed to a second driveshaft, and the second driveshaft is located upstream from the first driveshaft.

4. The method of claim 2, wherein the plurality of scores are formed while said cutting of the dough sheet to form the plurality of dough strips.

5. The method of claim 2, wherein the at least one circular cutter is fixed to a driveshaft, and the at least one blade is a circular blade fixed to the driveshaft.

6. The method of claim 1, wherein a plurality of scores are formed after the dough sheet is cut to form the plurality of dough strips.

7. The method of claim 6, wherein the at least one circular cutter is fixed to a first driveshaft, the at least one blade is a circular blade fixed to a second driveshaft, and the second driveshaft is located downstream from the first driveshaft.

8. The method of claim 1, wherein the score is parallel to a longitudinal axis of the at least one of the plurality of un-proofed dough pieces.

9. The method of claim 1, wherein the score is at an angle to a longitudinal axis of the at least one of the plurality of un-proofed dough pieces.

10. The method of claim 1, wherein the at least one blade is selected from the group consisting of a circular blade, a water blade, an ultrasonic blade and a laser blade.

11. A production line for producing frozen un-proofed dough pieces with a plurality scores, the production line comprising:
    a conveyor configured to transport a dough sheet having a lower skin for contacting the conveyor and an upper skin opposite the lower skin;
    at least one circular cutter configured to cut the dough sheet into a plurality of dough strips as the at least one circular cutter rotates, the at least one circular cutter having a dough engaging portion configured to press the upper skin toward the lower skin to pinch the upper and lower skins together while cutting to form first and second dough strip sides;
    a cutting device for cutting the plurality of dough strips to form a plurality of un-proofed dough pieces; and
    at least one blade configured to penetrate the upper skin to cut through in part the dough sheet from the upper skin toward the lower skin to form a score for each of the plurality of un-proofed dough pieces prior to freezing the plurality of un-proofed dough pieces, wherein the at least one blade is configured to form the score that forms an opening during baking of a respective one of said plurality of un-proofed dough pieces.

12. The production line of claim 11, wherein the production line is configured to:
    form the scores before said cutting of the plurality of dough strips to form the plurality of un-proofed dough pieces; and
    freeze the plurality of un-proofed dough pieces.

13. The production line of claim 12, wherein the production line includes a first driveshaft and a second driveshaft located upstream from the first driveshaft, the at least one circular cutter being fixed to the first driveshaft and the at least one blade being a circular blade fixed to the second driveshaft.

14. The production line of claim 12, wherein the production line is configured to form the plurality of scores while cutting the plurality of dough strips to form the plurality of un-proofed dough pieces.

15. The production line of claim 12, wherein the at least one blade is a circular blade and the production line includes a driveshaft, with both the at least one circular cutter and the at least one blade being fixed to the driveshaft.

16. The production line of claim 11, wherein the production line is configured to form the plurality of scores after the dough sheet is cut to form the plurality of dough strips.

17. The production line of claim 16, wherein the production line includes a first driveshaft and a second driveshaft located downstream from the first driveshaft, the at least one circular cutter being fixed to the first driveshaft and the at least one blade being a circular blade fixed to the second driveshaft.

18. The production line of claim 11, wherein the production line is configured to form the score parallel to a longitudinal axis of a respective one of the plurality of un-proofed dough pieces.

19. The production line of claim 11, wherein the production line is configured to form the score at an angle to a longitudinal axis of a respective one of the plurality of un-proofed dough pieces.

20. The production line of claim 11, the at least one blade is selected from the group consisting of a circular blade, a water blade, an ultrasonic blade and a laser blade.

* * * * *